(12) United States Patent
Théorêt et al.

(10) Patent No.: US 8,132,739 B2
(45) Date of Patent: Mar. 13, 2012

(54) HYDRO-THERMO IRRIGATION MAT

(75) Inventors: Richard Théorêt, Laval (CA); Sylvain Hélie, St-Isidore (CA)

(73) Assignee: Universite Laval, Québec, QC (CA)

( * ) Notice: Subject to any disclaimer, the term of this patent is extended or adjusted under 35 U.S.C. 154(b) by 659 days.

(21) Appl. No.: 12/094,870

(22) PCT Filed: Nov. 29, 2006

(86) PCT No.: PCT/CA2006/001949
§ 371 (c)(1),
(2), (4) Date: Dec. 9, 2008

(87) PCT Pub. No.: WO2007/062517
PCT Pub. Date: Jun. 7, 2007

(65) Prior Publication Data
US 2009/0134242 A1    May 28, 2009

(30) Foreign Application Priority Data

Nov. 29, 2005   (CA) ..................................... 2528416

(51) Int. Cl.
*B05B 17/04* (2006.01)
*B05B 1/24* (2006.01)
(52) U.S. Cl. ............ 239/13; 239/542; 239/135; 47/48.5; 47/79; 47/88
(58) Field of Classification Search .................. 239/542, 239/128, 139, 13; 47/79, 48.5, 88
See application file for complete search history.

(56) References Cited

U.S. PATENT DOCUMENTS

| 1,442,367 | A | * | 1/1923 | Stevens ...................... 47/1.01 R |
| 4,065,926 | A | * | 1/1978 | Brandt ............................ 405/36 |
| 4,955,158 | A | | 9/1990 | Lyon |
| 5,117,580 | A | * | 6/1992 | Brown ................. 47/9 |
| 5,368,092 | A | * | 11/1994 | Rearden et al. ................. 165/45 |
| 5,839,659 | A | | 11/1998 | Murray |
| 6,178,691 | B1 | * | 1/2001 | Caron et al. ..................... 47/79 |
| 2003/0213171 | A1 | * | 11/2003 | Kruer et al. ................... 47/62 E |

FOREIGN PATENT DOCUMENTS

| CA | 2510441 | 7/2004 |
| CA | 2498077 | 8/2006 |
| JP | 10229756 | 9/1998 |
| JP | 10229757 | 9/1998 |
| WO | WO 02/082888 | 10/2002 |
| WO | WO 2004/056172 | 7/2004 |

* cited by examiner

*Primary Examiner* — Dinh Nguyen
(74) *Attorney, Agent, or Firm* — Norton Rose Canada LLP

(57) ABSTRACT

A hydro-thermo irrigation mat (10) is comprised of a base sheet (11), a water-permeable root-shielding top sheet (12), and a capillary mat (15) of absorbent material therebetween. One or more flat pliable drip tapes (18) are loosely disposed in spaced-apart relationship between the top sheet (12) and the capillary mat (15). Hot water convection tubes (25) are disposed co-axially with the drip tapes (18) but between the base sheet (11) and the capillary mat (15). The drip tapes (18) are connected to a water supply line (22) and the hot water convection tubes (25) are secured to a hot water supply line (28). Water within the mat is heated and distributes heat from the hot water convection tubes (25) substantially throughout the mat.

15 Claims, 2 Drawing Sheets

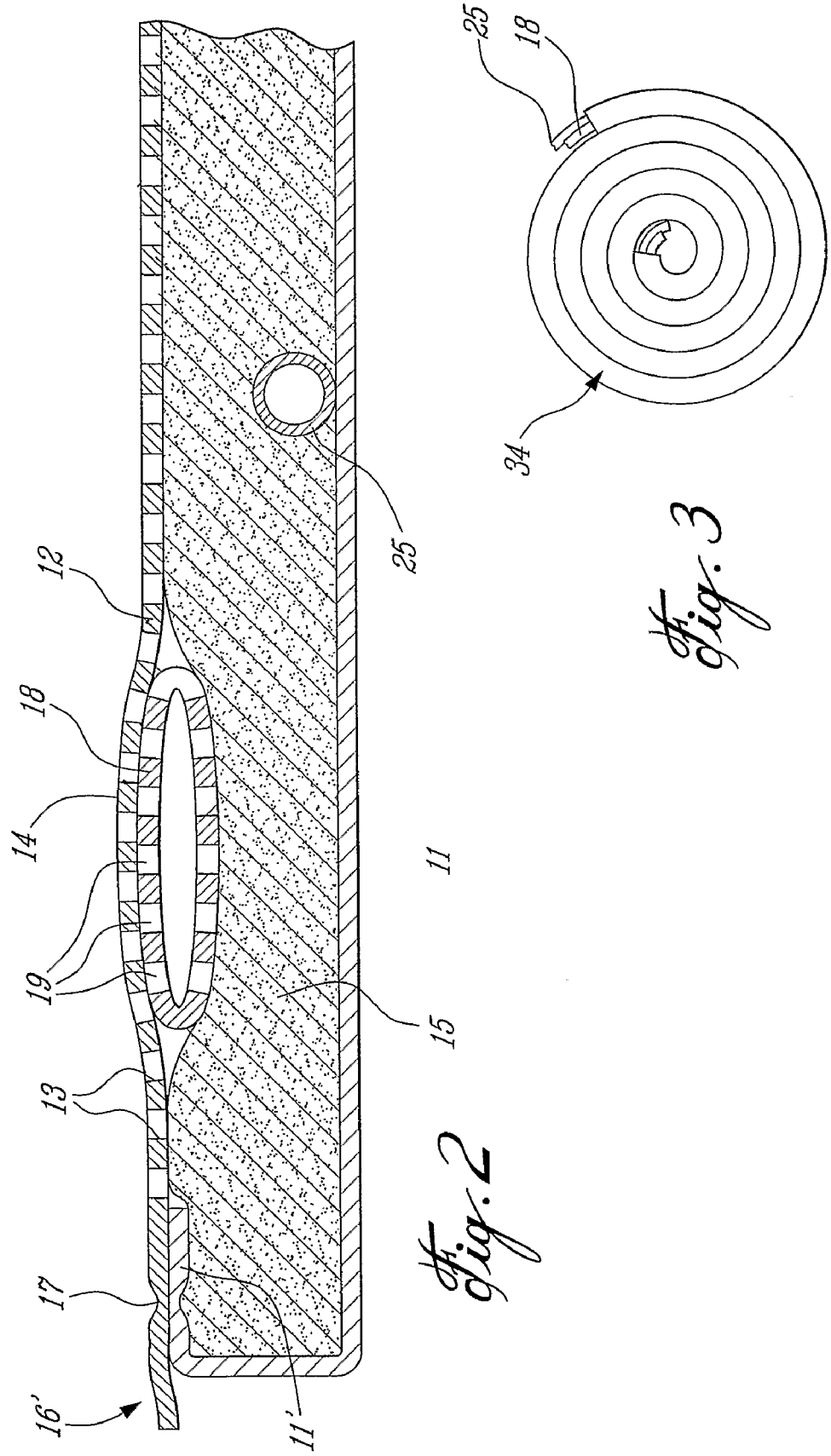

HYDRO-THERMO IRRIGATION MAT

TECHNICAL FIELD

The present invention relates to a hydro-thermo irrigation mat and particularly, but not exclusively, for heating and watering potted plants in nurseries during cold weather conditions.

BACKGROUND ART

Irrigation mats are known and an example of these is described in PCT application WO2004/056172 filed on Dec. 23, 2002 and relating to an irrigation mat for the irrigation of potted plants. This mat was designed primarily to absorb and retain water which is sprinkled over the mat by overhead sprinklers. U.S. Pat. No. 5,839,659 discloses a capillary root zone irrigation system utilizing an irrigation mat wherein water is supplied into the mat by rigid polyethylene pipes which are perforated. These types of mats are cumbersome and need to be assembled on site and are very expensive.

In our pending application Ser. No. 2,498,077 there is described an irrigation mat which includes drip tapes incorporated therein and wherein the mat and the drip tapes can be rolled into a bundle for shipping and storage.

In order to save energy in heating plants in greenhouses there is on the market a floor mesh in which tubes are connected thereto and which are then connected to a hot water supply whereby hot water is directed in these tubes. The tubes are disposed on a support table onto which are placed potted plants whereby to heat the plants directly. Accordingly it is not necessary to heat the entire greenhouse to provide heat to the plants and this translates into energy savings. This system is known as a root zone heating system. However, when heating potted plants the heat normally dries up the plants particularly in small cells for growing propagation plugs and accordingly it is necessary to periodically water the plants. Also, the heat is not evenly distributed on the contact surface of the pot. Also, these tubes being exposed directly onto a support table or on potted plants are subject to puncture and therefore malfunction. If one of the tubes in the assembly becomes punctured then the entire assembly is rendered inoperative and this requires for an entire arrangement of plants to be removed from the table to remove the heating tubes and then to position new tubes and reposition the plants on the table. This is time consuming and expensive. Because the tubes are exposed to ambient air, a lot of the heat is lost into the space. This system is not totally efficient.

DISCLOSURE OF INVENTION

It is a feature of the present invention to provide a hydro-thermo irrigation mat which substantially overcomes the above-mentioned disadvantages of the prior art.

According to the above feature, from a broad aspect, the present invention provides a hydro-thermal irrigation mat which comprises a base sheet, a water-permeable root-shielding top sheet and a capillary mat of absorbent material having capillary properties to permit water dispersion therein and held captive between said base sheet and top sheet. One or more flat pliable drip tapes are loosely disposed in spaced-apart relationship between the top sheet and the capillary mat. The drip tapes are hollow flat tubes of perforated plastics material and extend between opposed ends of the irrigation mat. Hot water convection tubes are also disposed between the base sheet and the capillary mat for heating the mat. The hot water convection tubes are disposed co-axially with the drip tapes. The base sheet and the top sheet are secured together along overlapped edge portions thereof by securement means.

According to a further broad aspect of the present invention there is provided a method of irrigating potted plants supported on a mat as described above and simultaneously providing heat to the potted plants by the mat.

According to a further feature of the present invention there is provided the use of the hydro-thermal irrigation as defined herein above to heat and irrigate potted plants inside a greenhouse during cold weather conditions.

BRIEF DESCRIPTION OF THE DRAWINGS

A preferred embodiment of the present invention will now be described with reference to the accompanying drawings in which:

FIG. 2 is cross section view of the hydro-thermo irrigation mat; and

FIG. 3 is an end view showing a hydro-thermo irrigation mat in a rolled form.

MODES FOR CARRYING OUT THE INVENTION

Figure 1:
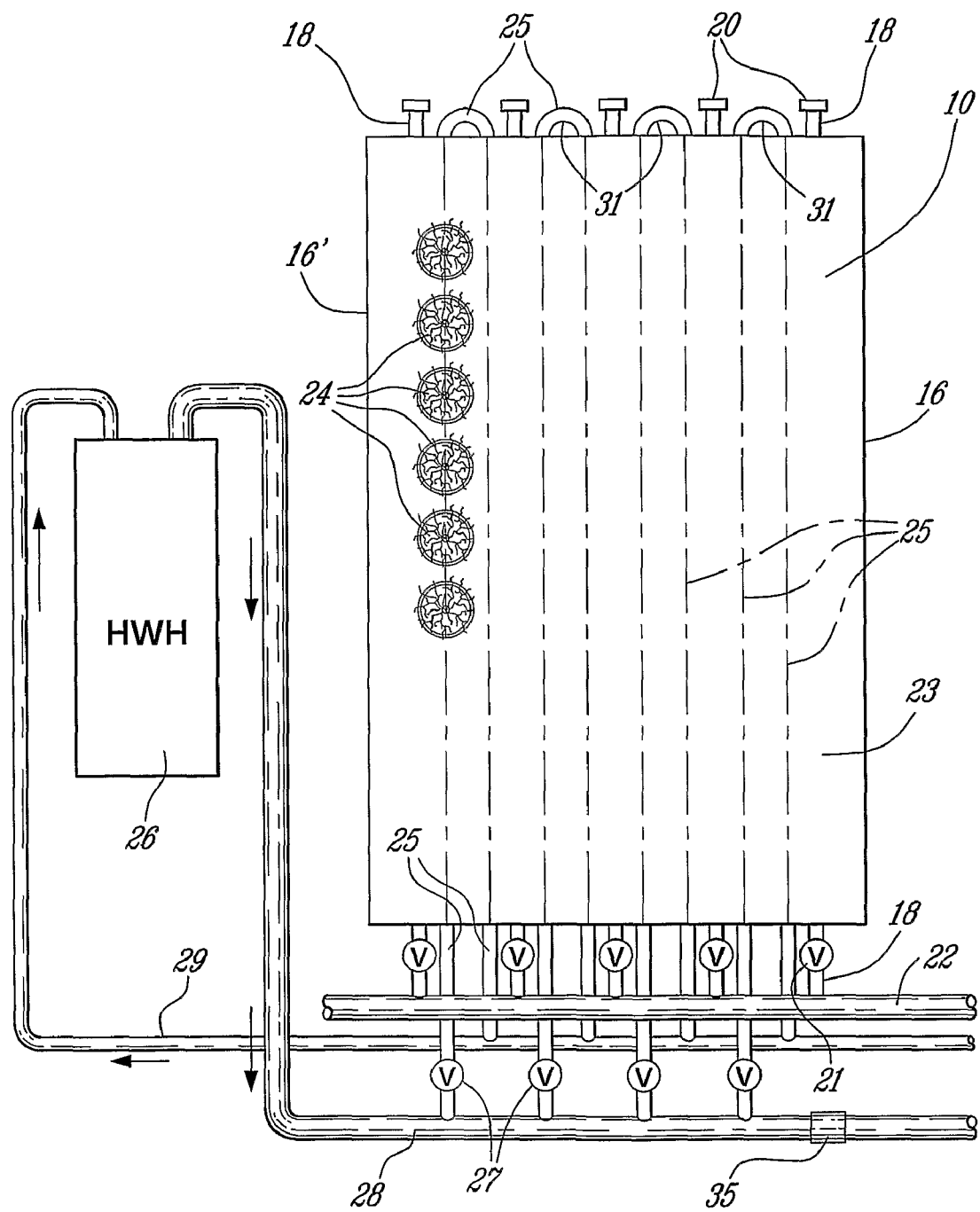
FIG. 1 is plan view of the hydro-thermo irrigation mat of the present invention.

Referring now to the drawings and more particularly to FIG. 1 there is shown generally at 10 the hydro-thermo irrigation mat of the present invention. With further reference to FIG. 2 there is shown the construction of the irrigation mat and as herein shown it is comprised of a base sheet 11 which is an impermeable base sheet but may alternatively have holes or slits therein in an amount small enough to allow a very slow seepage of water from the mat to a ground surface when supported thereon. These slits or holes are not large enough to allow good contact with the underneath soil. The mat also comprises a water permeable top sheet 12 provided with perforations 13 to permit the passage of water to the top surface 14 of the top sheet 12.

Between the bottom sheet 11 and the top sheet 12 is disposed a capillary mat 15 of absorbent material having high capillary properties whereby to permit circulation of water in all direction therein. The water as retained by the mat seeps out of the top sheet through the holes or slits which have openings in a range of about 10 to 50 microns. The base sheet 11, the top sheet 12 and the capillary mat 15 are secured together along their longitudinal edges 16 and 16' by a heat seal 17 or other suitable securing means. As herein shown the base sheet 11 has a folded over portion 11' which wraps the ends of the capillary mat 15 and it is fused to the top sheet 12 by the heat seal 17.

One or more flat pliable drip tapes 18 are disposed between the top sheet 12 and the capillary mat 15 of absorbent material and these drip tapes are spaced apart along the length of the mat 10, as illustrated in FIG. 1. These drip tapes are hollow flat plastic tubes which are perforated with holes 19 throughout their length. The drip tapes are provided with plugs 20 at an end thereof and their opposed ends are provided with valve connectors 21 or straight pipe connectors which secure to a water distribution pipe 22 and these valve connectors can regulate the amount of water admitted in these drip tapes. Accordingly, water distribution can be controlled by these valves or by remotely controlling or manually controlling the supply of water in the pipe 22 or remotely controlling the valve 21.

The drip tapes 18 admit water within the capillary mat and this water seeps on the top surface 23 of the mat wherein potted plants 24 are disposed. The potted plants are in pots which have a perforated bottom wall or the pots are permeable whereby the roots will draw water from the top of the mat.

With reference again to FIGS. 1 and 2 it can be seen that the irrigation mat 10 of the present invention is also provided with hot water convection tubes 25 disposed between the base sheet 11 and the capillary mat 15. These tubes extend longitudinally throughout the mat, as illustrated in FIG. 1, and preferably aligned between the drip tapes 18. These hot water convection tubes are also fabricated as hollow flexible plastic tubes having a wall thickness of about 7 mm and as herein shown are connected to a hot water supply pipe from a hot water heater tank 26. The tubes 25 extend from a hot water supply pipe 28, and forms a first section extending across the mat 10 and are looped at 31 outside the mat to make a return path section in the mat to then connect to the return pipe 29. The hot water dissipates heat into the water of the capillary mat 15 and provides substantially even heat throughout the mat. Much of the heat is captured within the mat 10 and there is less heat loss in the space but direct transfer to the pots and the plant roots.

Valves 27 control the flow of hot water from the supply pipe 28 connected to the hot water tank 26 and this water flows back into the water tank by the return conduit 29. The other ends of the tubes 25 are connected to the return pipe 29 by suitable connectors 30. Accordingly, these hot water convection tubes supply heat to the mat and to the water as contained therein which act as a heat convection medium so that heat is supplied throughout the mat and not only in the areas where the tubes 25 extend. Because the heat is distributed throughout the mat, pots can be placed anywhere on the mat top surface. Also, because of the placement of these tubes and because of the thickness of the capillary mat 15 the hydro-thermo irrigation mat has a top surface which is quite stable and not bumpy as would be the case should the pot be placed directly on pipes or rigid heating tubes as is the case with the prior art.

An important feature of the hydro-thermo irrigation mat is that it provides both irrigation and heat through a single mat and it is therefore not necessary to have an overhead sprinkling system in operation, particularly during cold weather conditions where potted plants are growing inside a greenhouse. However, when growing plugs, overhead watering and misting is desired for propagation of plants.

The mats also provide good water management as well as an economical method for heating potted plants. Although in FIG. 1 there is shown a hot water heater connected to a single mat it is to be understood that the water heater would connect to several mats disposed in parallel between the supply line 28 and the return line 29. The supply line and return lines can be provided with connectors whereby to interconnect to other pipes. These connectors are designated by reference numeral 35 in FIG. 1. A system of valves could also control different mats in a system to shut-off mats or supply more or less heat to other mats.

FIG. 3 illustrates a further advantage of the mat constructed in accordance with the present invention wherein the mat can be rolled together with the drip tapes and heat convection tubes to form a rolled bundle 34 which is easy to ship and transport and install. As herein shown the drip tapes 18 and heat convection tubes 25 extend out of the ends of the mat for ease of connection. Accordingly, the mat is pre-assembled with its piping, i.e. flat tapes.

It is within the ambit of the present invention to cover any obvious modifications of the preferred embodiment described herein, provided such modifications fall within the scope of the appended claims.

The invention claimed is:

1. A hydro-thermo irrigation mat comprising a base sheet, a water-permeable root-shielding top sheet, a capillary mat of absorbent material having capillary properties to permit water dispersion therein and held captive between said base sheet and top sheet, one or more flat pliable drip tapes loosely disposed in spaced-apart relationship between said top sheet and said capillary mat, said drip tapes being hollow flat tubes of perforated plastics material and extending between opposed ends of said irrigation mat, and hot water convection tubes disposed between said base sheet and said capillary mat for heating said mat, the hot water convection tubes being disposed underneath the capillary mat that is on a side thereof opposite to said one or more flat pliable drip tapes and dissipating heat from below said capillary mat into the water contained in the capillary mat, said hot water convection tubes being disposed co-axially with said drip tapes; said base sheet and top sheet being secured together along overlapped edge portions thereof by securement means.

2. A hydro-thermo irrigation mat as claimed in claim 1 wherein said hot water connection tubes are hollow, flat tubes of flexible plastics material.

3. A hydro-thermo irrigation mat as claimed in claim 2 wherein said mat with said drip tapes and hot water connection tubes are pliable to permit same to be rolled to form a shipping bundle.

4. A hydro-thermo irrigation mat as claimed in claim 1 wherein said root shielding top sheet is provided with perforations dimensioned to allow the passage of water from said mat to an outer surface of said top sheet.

5. A hydro-thermo irrigation mat as claimed in claim 4 wherein said perforations are one of holes or slits defining openings in the range of about 10 to 50 microns.

6. A hydro-thermo irrigation mat as claimed in claim 1 wherein said securement means is a heat seal interconnecting said base sheet to said top sheet.

7. A hydro-thermo irrigation mat as claimed in claim 1 wherein there is provided two or more of said flat pliable drip tapes, said hot water connection tubes being disposed between adjacent drip tapes, said drip tapes being connected at one end to a water distribution pipe and being seated at an opposed end.

8. A hydro-thermo irrigation mat as claimed in claim 7 wherein said hot water connection tubes being adjacent drip tapes being connected at one end to a hot water supply pipe and at an opposed end to a return pipe, said hot water supply pipe and said return pipe being connected to a hot water heater tank.

9. A hydro-thermo irrigation mat as claimed in claim 8 wherein said water connection tubes between adjacent drip tapes define a first section connected to said hot water supply pipe and extending across the mat and looped outside said mat to form a return section across the mat and connected to said return pipe.

10. A hydro-thermo irrigation mat as claimed in claim 7 wherein said top sheet of said irrigation mat defines a substantially stable top surface to support potted plants having permeable bottoms whereby to irrigate and heat said potted plants.

11. A hydro-thermo irrigation mat as claimed in claim 7 wherein said drip tapes and connecting tubes are connected to a valve whereby to control the supply of water thereto.

12. A method of irrigating potted plants supported on a mat as claimed in claim 1 and simultaneously providing heat to said potted plants by said mat.

13. A method as claimed in claim 12 wherein water within said absorbent material provides the step of distributing heat from said hot water convection tubes throughout said mat.

14. The use of the hydro-thermo irrigation mat as claimed in claim 1 to heat and irrigate potted plants inside a greenhouse during cold weather conditions.

15. A root zone heating and irrigation system comprising a hydro-thermo irrigation mat having a water permeable top sheet, a base sheet and a capillary mat disposed between the top sheet and the base sheet, at least one watering tube integrated into the hydro-thermo irrigation mat for supplying water to said capillary mat, and hot water convection tubes integrated into said hydro-thermo irrigation mat for dissipating heat directly into the water of the capillary mat, the hot water convection tubes being disposed underneath the capillary mat to dissipate heat from below the capillary mat towards the top sheet.

* * * * *